July 17, 1928.

R. V. KAIMER

LATCH FOR VEHICLE DOORS

Original Filed Aug. 13, 1925

Re. 17,035

2 Sheets-Sheet 1

Inventor
Richard V. Kaimer
by Seymour Farr
Atty.

July 17, 1928.

R. V. KAIMER

LATCH FOR VEHICLE DOORS

Re. 17,035

Original Filed Aug. 13, 1925

2 Sheets-Sheet 2

Inventor
Richard V. Kaimer
by Seymour Cone
Atty

Reissued July 17, 1928. Re. 17,035

UNITED STATES PATENT OFFICE.

RICHARD V. KAIMER, OF NEW HAVEN, CONNECTICUT, ASSIGNOR TO THE ENGLISH & MERSICK CO., OF NEW HAVEN, CONNECTICUT, A CORPORATION.

LATCH FOR VEHICLE DOORS.

Original No. 1,562,096, dated November 17, 1925, Serial No. 49,887, filed August 13, 1925. Application for reissue filed November 11, 1927. Serial No. 232,921.

Figure 1:
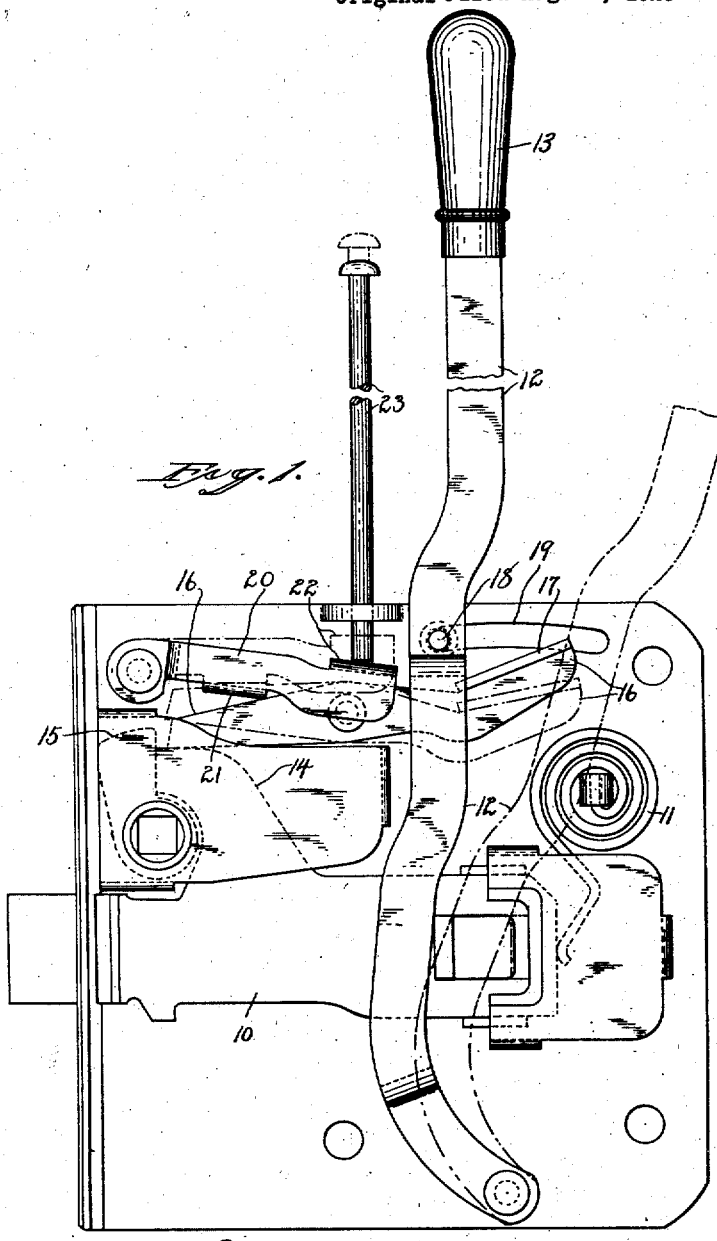

I do hereby declare the following, when taken in connection with the accompanying drawings and the characters of reference marked thereon, to be a full, clear, and exact description of the invention, and which said drawings constitute part of this application, and represent, in Fig. 1 an inside view of a latch for vehicle doors constructed in accordance with my invention.

Figure 2:
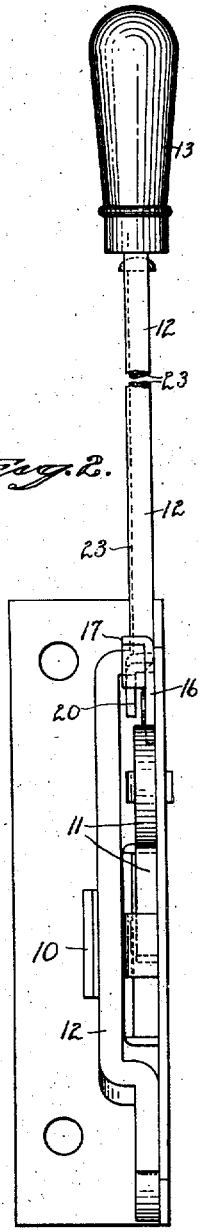

Fig. 2 a rear view of the same.

Figure 3:
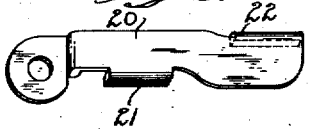

Fig. 3 a perspective view of the push-rod lever, detached.

Figure 4:
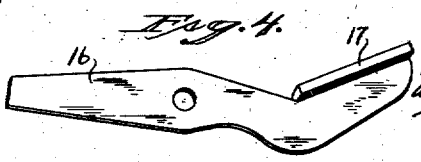

Fig. 4 a perspective view of the locking-lever detached.

Figure 5:
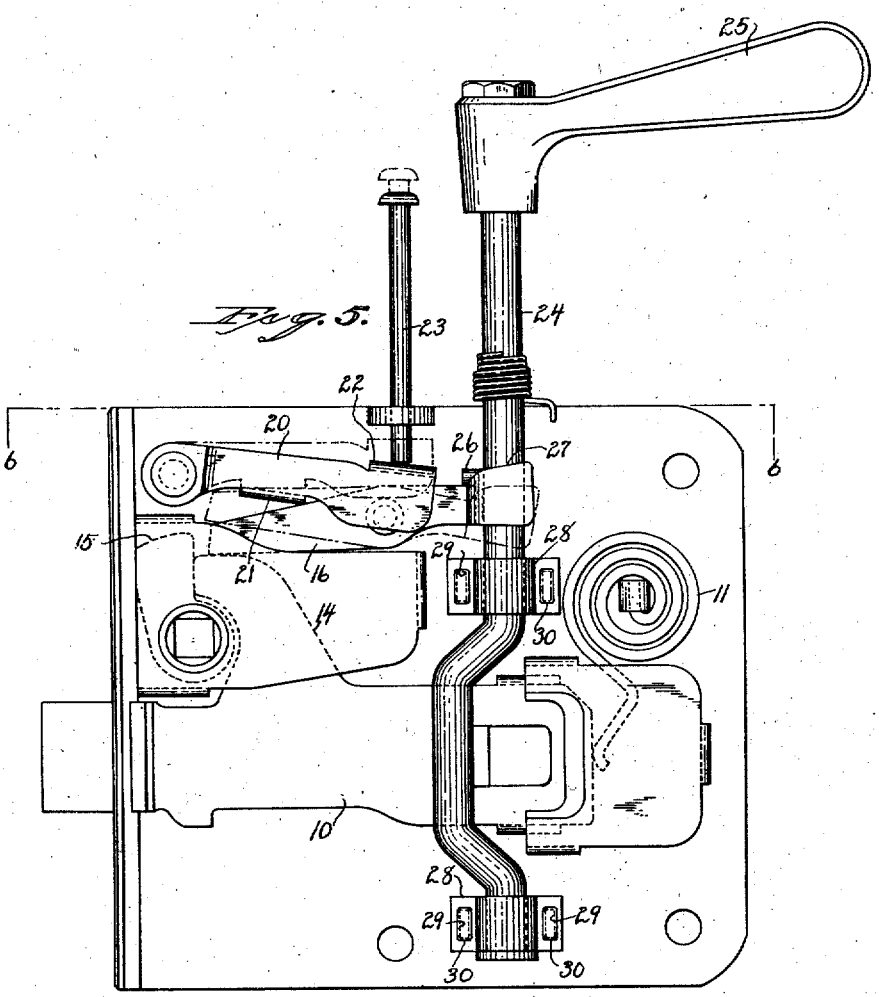

Fig. 5 an inside view of a latch embodying my invention, operated by a vertically arranged rotary spindle.

Figure 6:
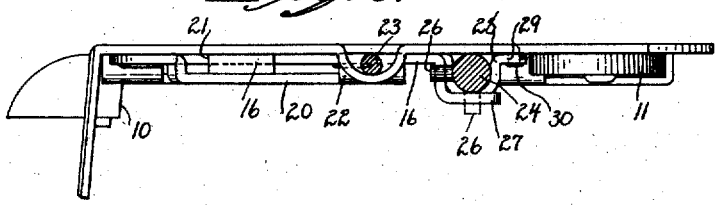

Fig. 6 a sectional view on the line 6—6 of Fig. 5.

This invention relates to improvements in latches for vehicle doors, and particularly to latches for this purpose which are provided with means for locking the latch-bolt in its thrown position. The latch-bolt is usually retracted by the well known "pivoted lever" or "rotary lever". In some of my prior patents the locking means for the latch bolt is actuated by a push-button and associated parts carried by the operating lever, whether of the pivoted or rotary type, and projecting from the upper end thereof. Examples of such structures will be found in Patents 1,415,839 of May 9, 1922, 1,453,712 of May 1, 1923, and 1,551,032 of August 25, 1925, Reissue 16,735 of September 13, 1927.

The general object of the present invention is to provide lock actuating means independent of the operating lever but projecting upwardly from the latch structure to a convenient position adjacent the said operating lever, in conjunction with means for automatically releasing the latch-bolt when the operating lever is manipulated to open the door.

A contributory object is to provide an arrangement of two levers, one operated by a vertically arranged push-rod to throw the other lever into position to lock the bolt, said other lever being moved out of its locking position whenever the door is opened from the inside.

Other objects relate to features of construction which will be apparent from the following description of one embodiment of the invention.

In Figs. 1 and 2 of the drawings, I have shown the invention as applied to a latch for vehicle doors operated by a pivoted or swinging lever. In carrying out my invention, I employ the usual latch-bolt 10, normally thrown forward by a spring 11, and adapted to be engaged for rearward movement by a lever 12 extending upward through the door and provided at its upper end with a handle 13. The bolt is provided with the usual upward projection 14 extending into the path of a roll-back 15, which, in the present instance, extends upwardly from the usual square shaft (not shown) and is adapted to be operated by a handle on the outside of the door. Pivotally mounted above the bolt is a locking-lever 16, the nose of which is adapted to be turned into the path of the roll-back 15. At its rear end, this lever is formed with a cam-lip 17 adapted to be engaged by a stud 18 mounted in the lever and traveling in a segmental slot 19. Pivotally mounted on the case-plate, above and forward of the locking-lever 16, is a push-button lever 20, formed with a lip 21 adapted to bear upon the upper edge of the locking-lever 16, and with a lip 22 at its rear end in line with a vertically arranged push-rod 23, which is mounted in the case closely adjacent to the lever 12, and in convenient position to be operated from the inside of a car.

When it is desired to lock the door in its closed position, the push-rod 23 is depressed, forcing the push-rod lever 20 downward, causing the lip 21 to engage with the edge 16 of the locking-lever and force it down into the path of the roll-back 15. To move the locking-lever out of its locked position, the lever 12 is moved rearwardly whereupon the stud 18 engages with the lip 17, so as to depress the rear end of the locking-lever and lift its forward end out of the path of movement of the roll-back. At the same time, this upward movement of said end lifts the push-button lever and with it the push-rod 23, so that it is in position for relocking the door when desired.

In Fig. 5 of the drawings, I have shown my invention as applied to a well-known rotary lever form of vehicle door latch, in which the bolt is operated by a vertically arranged, rotatable spindle 24, operated by a handle 25. This spindle engages with the bolt 10 to retire it, and the other parts of the latch-mechanism are the same as those above described, except there is no necessity for the segmental slot 19, but the spindle 24 is provided with a stud 26 to engage with the rear end 27 of the locking-lever 16, to depress the latter when the spindle is rotated. In this construction, it is desirable to mount the operating lever near the inner surface of the supporting case-plate, and I prefer to do this by means of straps 28 which set over the spindle 24 and are provided at their ends with slots 29 which set over projections 30, which are struck up from the latch-plate and upset to lock the straps in position. The term "inside" refers to the surface of the case-plate visible in Figs. 1 and 5 for example, although when the structure is applied to an automobile door, the opposite side of said face-plate becomes part of the inside surface of the door, as will be apparent from Fig. 6, wherein the bevel on the end of the latch-bolt is clearly shown. The "front" end of the structure, as described, is the end from which said beveled latch-bolt projects.

What I claim is:

1. A latch, comprising a bolt, a lever for retiring said bolt, a roll-back adapted to retire said bolt, a locking-lever pivoted above the bolt and extending into the path of the roll-back, a push-rod lever pivoted at one end, above and forward of the locking-lever, a push-rod mounted in line with and bearing upon the push-rod lever and adapted, when forced down, to depress the forward end of the locking-lever, and means for depressing the rear end of the locking lever to lift it out of the path of the roll-back and to raise the push-rod.

2. A latch, comprising a bolt, a swinging lever for retiring said bolt formed with a projection, a roll-back adapted to retire said bolt, a locking-lever pivoted above the bolt and extending into the path of the roll-back, a push-rod lever pivoted at one end above and forward of the locking-lever and adapted, when forced down, to depress the forward end of the locking-lever, the rear end of said locking-lever extending into the path of the projection on the swinging lever.

3. A latch, comprising a bolt, a lever for retiring said bolt formed with a projection, a roll-back adapted to retire said bolt, a locking-lever pivoted above the bolt and extending into the path of the roll-back, and into the path of the projection on the bolt-lever, a push-rod lever pivoted at one end and forward of the locking-lever and formed with a lip adapted to engage with the upper edge of the locking-lever and with a second lip, a push-rod in position to engage said second lip, the rear end of the locking-lever being formed with a cam-surface adapted to be engaged by said projection on the lever, whereby, when the lever is turned, the rear end of the locking-lever will be depressed and the forward end lifted out of the path of the roll-back.

4. A latch, comprising a bolt, a swinging lever for retiring said bolt formed with a projection, a roll-back adapted to retire said bolt, a locking lever pivoted above the bolt and extending into the path of the roll-back, a substantially vertical push-rod associated with said locking lever and independent of said swinging lever and adapted, when forced down, to depress the forward end of the locking lever, the rear end of said locking lever extending into the path of the projection on the swinging lever.

5. A lock for a vehicle door comprising a case-plate, a slidable locking bolt, an operating member for retracting said bolt from the inside of the door, a roll-back for retracting said bolt from the outside of the door, a lever pivoted to said case-plate, a manually operable, vertically movable member projecting above said case-plate whereby it may be depressed to move said lever about its pivot to project one end of said lever into the path of the roll-back to prevent the operation of the latter from the outside of the door, and means carried by said operating member for moving said lever from the path of the roll-back when said operating member is actuated.

6. A latch for automobile doors comprising a horizontally movable bolt, means for retracting said bolt operable from the inside of the door, means for retracting the same also from the outside of the door, a locking device movable to prevent operation of said outside bolt retracting means and a vertically movable member independent of said inside bolt retracting means operable from inside the door for rendering said locking device effective, the action of said inside bolt retracting means serving to restore said locking device to its ineffective position.

7. A latch for automobile doors comprising a vertical plate, a horizontally movable bolt mounted thereon and having a projection, a horizontal shaft carried by said plate at right angles thereto, a roll-back on said shaft engaging said projection, a locking device movably supported on said plate whereby one end may be lowered to obstruct the movement of said roll-back to prevent withdrawal of said bolt from the outside, a substantially vertical push-rod for causing such lowering movement and means mounted on said plate and cooperating with said horizontal bolt and said locking device to withdraw said bolt and simultaneously restore said locking device.

8. A latch for automobile doors comprising a vertical plate, a horizontally movable bolt mounted thereon and having a front and rear projection, a horizontal shaft carried by said plate at right angles thereto, a roll-back on said shaft engaging said front projection, a locking lever pivoted to said plate with its forward end adjacent said roll-back whereby rotation of said lever about its pivot will move said end into or out of the path of movement of said roll-back, an operating lever pivoted to said plate near the bottom thereof and engaging said rear projection to withdraw said bolt from inside the door, said operating lever extending upwardly past said locking lever, a projecting member on one of said levers and a cam surface on the other of said levers whereby the swinging of said operating lever to the rear causes said cam surface and member to co-act to turn said locking lever about its pivot and raise said forward end, and means projecting upwardly beyond the top of said plate and in front of said operating lever to cause a reverse movement of said locking lever to locking position, when actuated.

9. An automobile door lock comprising a vertical support, a horizontal bolt thereon, a plate on said support rotatable about a horizontal axis and having a cam surface to engage part of said bolt, a pivoted operating lever also engaging part of said bolt to retract the same, a pivoted locking lever having a portion engaged by a part of said rotatable plate when said locking lever is in locking position and a longitudinally movable member arranged, when pushed down, to move said locking lever to locking position, said pivoted operating lever, when drawn back, causing a reverse movement thereof to unlocking position.

10. In an automobile door lock, having a bolt and independent means for withdrawing the same from outside or inside the door, a pivoted locking lever, a substantially vertical rod structurally independent of the bolt withdrawing means and mechanically connected with said locking lever whereby it may be pushed down to set the latter in locking position, and a stud on said inside bolt withdrawing means engaging said lever, when said withdrawing means is actuated, whereby said locking lever is restored automatically.

In testimony whereof I have subscribed my name.

RICHARD V. KAIMER.